United States Patent [19]
Quintana et al.

[11] Patent Number: 5,478,117
[45] Date of Patent: Dec. 26, 1995

[54] ADJUSTABLE LENGTH SKI POL/CLAMP

[75] Inventors: Jason Quintana, Los Gatos, Calif.;
Steve C. McDonald, Portland, Oreg.;
Jordan Margid, Salt Lake City, Utah

[73] Assignee: Black Diamond Equipment, Ltd., Salt Lake City, Utah

[21] Appl. No.: 425,861

[22] Filed: Apr. 20, 1995

Related U.S. Application Data

[62] Division of Ser. No. 115,916, Sep. 1, 1993, Pat. No. 5,441,307.

[51] Int. Cl.⁶ ..................................................... A63C 11/22
[52] U.S. Cl. ............................... 280/823; 24/271; 24/273
[58] Field of Search ........................... 24/270, 271, 273; 280/819, 823; 403/235, 233

[56] References Cited

U.S. PATENT DOCUMENTS

| | | | |
|---|---|---|---|
| 973,466 | 10/1910 | Beegen | 24/271 X |
| 2,673,102 | 3/1954 | Hutchinson | 24/270 X |
| 2,862,275 | 12/1958 | Kessler | 24/270 |
| 3,305,234 | 2/1967 | Cline et al. | 24/270 X |
| 3,828,403 | 8/1974 | Perrin et al. | 24/273 X |
| 4,381,585 | 5/1983 | Morel | 24/270 |
| 5,366,263 | 11/1994 | Hendrickson | 24/273 X |

Primary Examiner—Margaret A. Focarino
Assistant Examiner—Michael Mar
Attorney, Agent, or Firm—Thorpe North & Western

[57] ABSTRACT

An adjustable length ski pole includes two telescopically fitted together ski pole halves, and a clamp disposed about the joint between the two pole halves. The clamp includes a resilient tubular member having an annular sidewall which defines a cylindrical bore, where the sidewall is formed with a longitudinally extending gap to allow the tubular member to be selectively biased to reduce the gap width and thus the diameter of the bore, or to enlarge the gap width and thus the diameter of the bore. The gap defines first and second opposing sidewall edges having coaxial first and second openings respectively. The clamp also includes a pin anchored at one end in the first opening to extend with the other end through the second opening, and a lever arm pivotally attached at one end to the other end of the pin, to move between a clamped position, in which the lever arm lies in contact with the ski pole to bias the first and second sidewall edges towards one another, and an unclamped position, in which the lever arm is pivoted away from the ski pole to allow the gap to widen. The sidewall edge includes a camming surface and the lever arm includes a camming knuckle formed at said one end to contact the camming surface and force the second sidewall edge toward the first sidewall edge when the lever arm is pivoted to the clamped position, to thereby secure the two pole halves in a fixed position relative to one another.

5 Claims, 2 Drawing Sheets

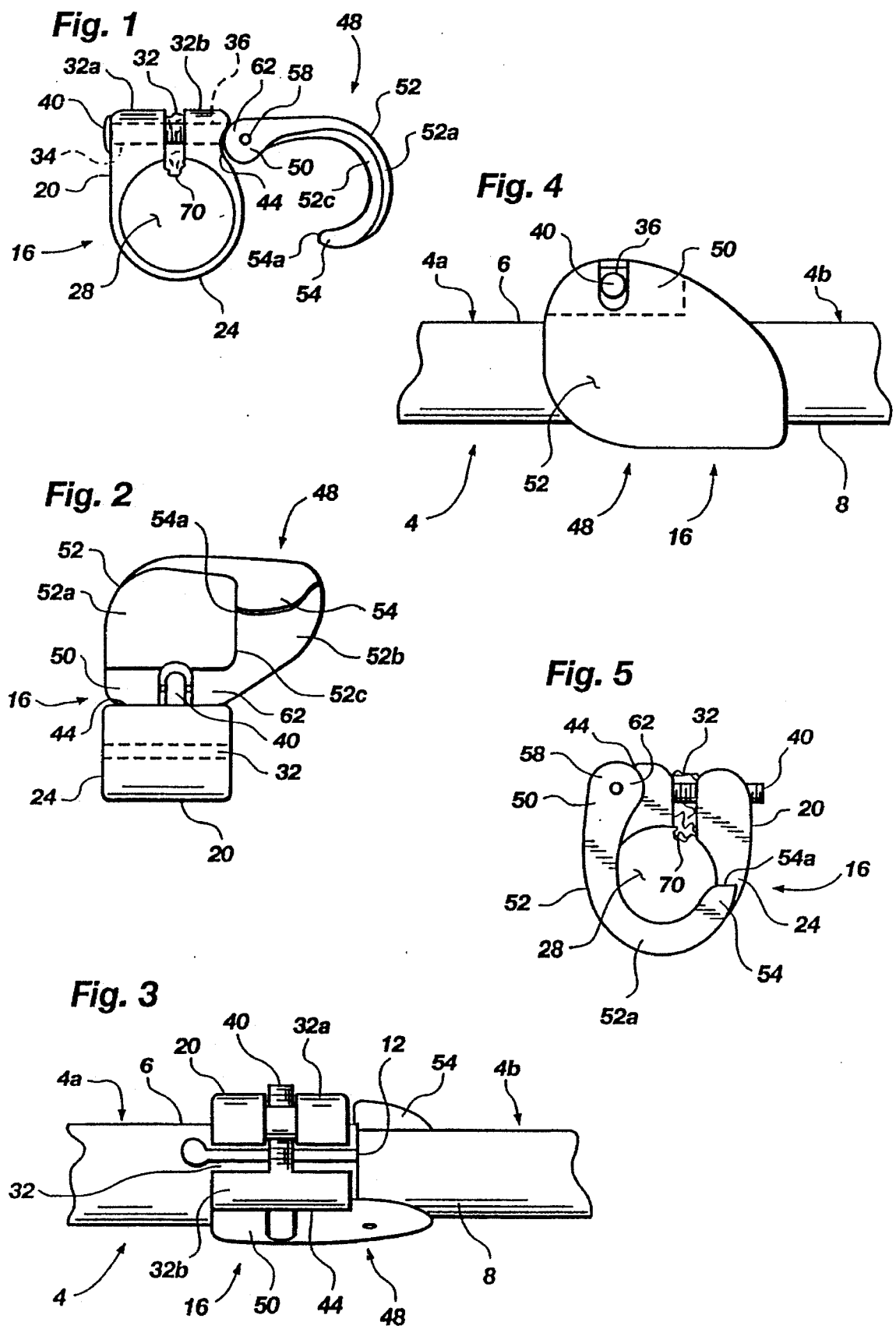

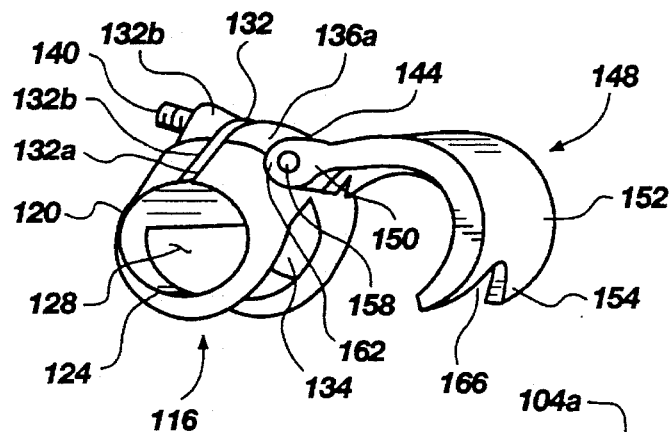
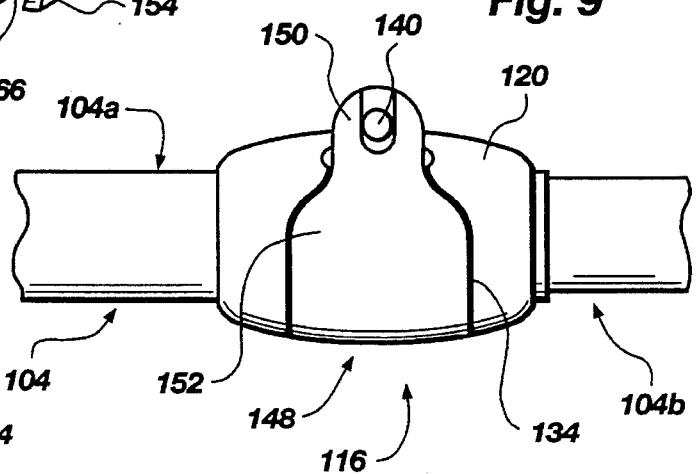
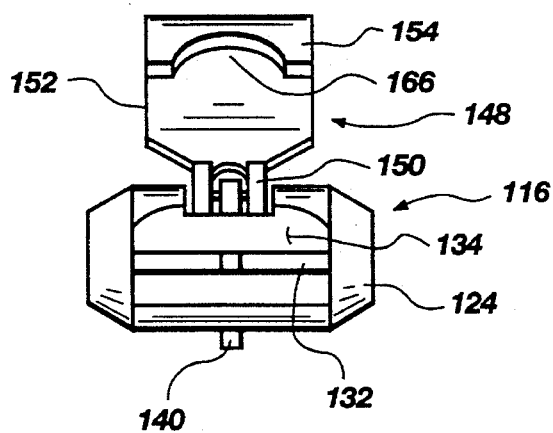
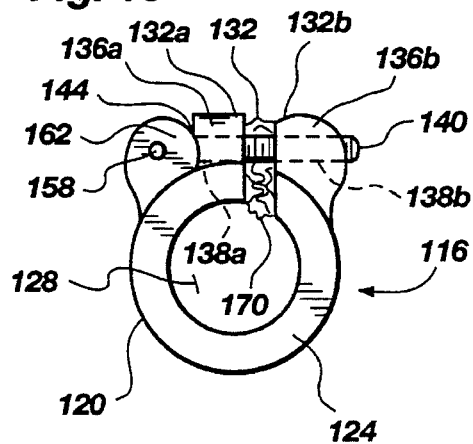
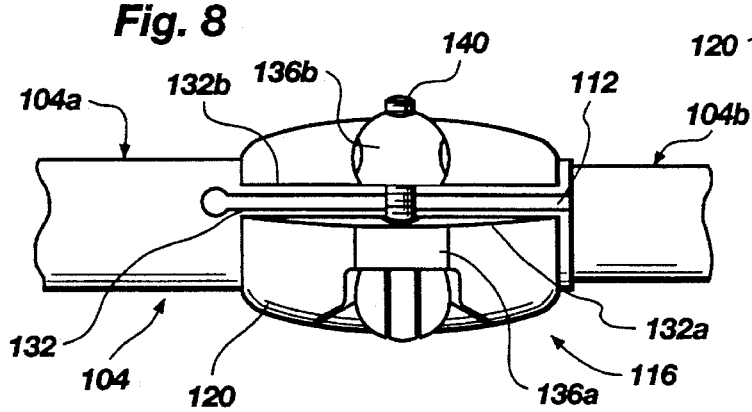

ADJUSTABLE LENGTH SKI POL/CLAMP

This application is a divisional of application Ser. No. 08/115,916 filed Sep. 1, 1993 now U.S. Pat. No. 5,441,307.

BACKGROUND OF THE INVENTION

This invention relates to a ski pole, with clamp, which allows for infinite adjustment of the length of the ski pole.

A number of adjustable length ski poles are being proposed, the purpose of such ski poles being to accommodate skiers of different height and for skiing under variable conditions, with a single set of ski poles. One proposal involves the use of two tubular half sections of a ski pole, fitted together telescopically, and employing a detent button disposed on one of the sections and a series of holes spaced longitudinally apart on the other section, into which the detent button fits to fix the pole at different lengths. The problem with this proposal is that the assembled ski pole tends to rattle even though the pole is made with fairly tight tolerances. Also, only discreet lengths are possible with such a pole since the different pole lengths are determined by the location and spacing of the holes into which the detent button fits. Finally, such a pole typically allows the entry of snow and/or water into the holes and detent mechanism, resulting in the pole being "frozen" into the length at which it is originally set when skiing is begun.

Another proposal for an adjustable length ski pole again involves the use of two telescoping halves, with the interior or inside half pole including a plug which expands a cone, when the half poles are twisted relative to one another, so that the cone contacts the walls of the exterior or outside half pole to prevent the two half poles from sliding relative to one another, i.e., to fix the length of the pole. Although this pole design does allow for an infinite number of lengths to be selected, the holding mechanism typically does not hold the pole securely at the selected length because of different coefficients of thermal expansion of the materials used, difficulty in obtaining tight tolerances for the assembled parts, etc. Also, because it is necessary to tightly twist one half pole relative to the other half pole to secure a pole length and to untwist the one half pole in order to loosen and change the length, if the weather becomes cold, it can be difficult to grasp the pole halves in order to either untwist them or twist and tighten them, especially since most poles are made of aluminum which can be slippery.

SUMMARY OF THE INVENTION

It is an object of the invention to provide an adjustable length ski pole which is lightweight, easily adjusted to vary the length, and secure and tight when set at a desired length.

It is also an object of the invention to provide such an adjustable length ski pole which is aesthetically pleasing in appearance.

It is a further object of the invention to provide such an adjustable length ski pole which is infinitely adjustable as to length.

It is still another object of the invention to provide such an adjustable length ski pole which is relatively resistant to entry of water or snow so that the likelihood of "freezing" the adjustment mechanism is minimized.

The above and other objects of the invention are realized in an adjustable length ski pole which includes an outer tubular section and an inner tubular section which may be telescopically fitted together, with the outer tubular section being squeezable to frictionally grip the inner tubular section. A low profile clamp is disposed about the outer tubular section to squeeze the outer section and secure the two tubular sections in a relative fixed position. The clamp includes a barrel section having an annular sidewall which defines a central cylindrical bore for receiving the outer tubular section. The sidewall has a slot which extends the length of the barrel section to define facing side edges of the slot which, when urged towards one another, reduces the central bore diameter to tighten around the tubular sections and, when urged apart, enlarges the central bore diameter. One of the side edges of the barrel section includes a camming surface such that when a force is applied thereto, the one side edge is urged toward the other side edge. The clamp also includes a lever arm pivotally attached to the side edges of the barrel section to pivot between a closed position, in which at least a portion of the lever arm rests against the outer tubular section to cause the barrel section to squeeze the outer tubular section so that it grips the inner tubular section, and an open position, in which the lever arm is pivoted away from the tubular sections to release the grip by the outer tubular section of the inner tubular section. The lever arm includes a camming knuckle which, when the lever arm is pivoted to the closed position, contacts and applies a force to the camming surface of said one side edge.

BRIEF DESCRIPTION OF THE DRAWINGS

The above and other objects, features and advantages of the invention will become apparent from a consideration of the following detailed description presented in connection with the accompanying drawings in which:

FIG. 1 is an end view of one illustrative embodiment of a ski pole clamp made in accordance with the principles of the present invention, with the clamp shown in the open position;

FIG. 2 is a side view of the ski pole clamp of FIG. 1, again with the clamp shown in the open position;

FIG. 3 is a top plan view of the ski pole clamp of FIG. 1, shown mounted on a ski pole in the closed position;

FIG. 4 is a side view of the ski pole clamp of FIG. 1, shown mounted on a ski pole in the closed position;

FIG. 5 is an end view of the ski pole clamp of FIG. 1, shown in the closed position;

FIG. 6 is a perspective view of another embodiment of a ski pole clamp made in accordance with the principles of the present invention, shown in the open position;

FIG. 7 is a bottom view of the ski pole clamp of FIG. 6, shown in the open position;

FIG. 8 is a top view of the ski pole clamp of FIG. 6 shown mounted on a ski pole in the closed position;

FIG. 9 is a side view of the ski pole clamp of FIG. 6 shown mounted on a ski pole in the closed position; and FIG. 10 is an end view of the ski pole clamp of FIG. 6 shown in the closed position.

DETAILED DESCRIPTION

Referring to FIGS. 1–5, there is shown various views of one embodiment of an adjustable length ski pole and clamp, made in accordance with the present invention. A fragmented view of a ski pole 4 is shown in FIGS. 3 and 4 to include an upper tubular section 4a having a handle end (not shown) on which would be installed a conventional ski pole handle, and a lower joint end 6 which is telescopically joined to a lower tubular section 4b. The lower tubular section 4b includes a lower end (not shown) on which would be installed a conventional ski pole basket, and an upper joint end 8 which is telescopically joined to the upper tubular section 4a. The upper tubular section 4a has a larger diameter to fit over the lower tubular section 4b, with the joint end 6 of the upper tubular section including an elongate slot or notch 12 (FIG. 3) which extends from the lower joint end 6 some distance toward the handle end, and which allows squeezing of the joint end 6 to reduce the circumference and diameter thereof so that it may frictionally grip the upper joint end 8 to prevent relative sliding between the upper tubular section 4a and lower tubular section 4b.

Disposable about the joint end 6 of the upper tubular section 4a is a clamp 16. The clamp includes a barrel-shaped tubular member 20 formed with an annular sidewall 24 which circumscribes a longitudinally extending central cylindrical bore 28 into which the joint end 6 of the upper tubular section 4a of the ski pole is inserted. The tubular member 20 is formed with a gap or slot 32 which extends the entire length of the tubular member to define facing or opposing sidewall edges 32a and 32b. The sidewall edges 32a and 32b are formed to be thicker than the rest of the sidewall 24 and include coaxially disposed bores or openings 34 and 36 (best seen in FIG. 1). The coaxial bores 34 and 36 are provided to receive a pin 40 (shown as threaded in the FIGS.) as will be discussed momentarily.

Formed on an exterior side of the sidewall edge 32b is a camming surface 44, shaped to be slightly concave, as best seen in FIGS. 1 and 5. The tubular member 20 is constructed of a resilient material such as plastic so that when a force is applied to the camming surface 44, the sidewall edge 32b is urged or biased toward the sidewall edge 32a, to narrow the slot width 32 and reduce the diameter of the central bore 28. This, in turn, allows for tightening the tubular member 20 about the joint end 6 of the upper tubular section 4a of the ski pole 4 to thereby cause the joint end 6 to grip the joint end 8 of the tubular section 4b and secure the two tubular sections in a fixed, non-slidable position.

The clamp 16 also includes a lever arm 48 pivotally attached to the tubular member 20 to pivot between an open position such as shown in FIGS. 1 and 2, and a closed position such as shown in FIGS. 3–5. The lever arm 48 includes a forked pivot end 50 (best seen in FIGS. 3 and 4), a curved, hook-like middle portion 52 and a terminal end 54. The pivot end 50 is pivotally attached by way of a pin 58 which bridges across the gap in the fork of the pivot end, to a non-anchored end of pin 40. Pin 40 is anchored in the bore 34 in sidewall edge 32a to extend across the slot 32 and through the bore 36 of the sidewall edge 32b, to protrude a short distance beyond the camming surface 44. An eyelet is formed in the protruding end of the pin 40 to receive the pin 58 and pivotally secure the lever arm 48 onto the protruding end of the pin 40.

The lever arm 48 is formed at its pivot end 50 with a knuckle or bulge 62 disposed rearwardly and on the concave side of the lever arm, so that when the lever arm is pivoted from the open position to the closed position, the knuckle 62 cams on the camming surface 44 to urge the sidewall edge 32b toward the sidewall edge 32a to narrow the slot 32 and reduce the diameter of the central cylindrical bore 28 and thereby tighten the sidewall 24 about the upper tubular section 4a to cause it to grip the lower tubular section 4b and prevent relative sliding therebetween. The knuckle 62 is also formed so that as the pivot arm 48 is moved from the open position a certain distance toward the closed position, it snaps in a type of over-center snapping action to the closed position.

The middle portion 52 of the lever arm 48 is formed with a curved web having a thinner section 52a which contacts and overlaps the barrel member 20 when the lever arm is moved to the closed position, and a thicker section 52b which projects forwardly from the thinner section 52a to contact and wrap about the upper and lower tubular sections 4a and 4b when the lever arm is in the closed position. A ridge or step 52c is formed between the thinner section 52a and thicker section 52b of the middle portion 52 and this step rests against one end of the barrel member 20 when the lever arm is in the closed position.

The terminal end 54 of the lever arm 48 is formed to present a blunt, tab-like surface 54a offset forwardly of the barrel member 20 when the lever arm is in the closed position, to enable pushing against the blunt surface 54a to move the lever arm from the closed position to the open position.

A foam insert 70 (FIGS. 1 and 5) may be disposed in the slot 32 to extend partly into the central bore 28. The foam insert 70 serves both to prevent entrance of water and/or snow into the slot 32 and to contact through the notch 12 the lower tubular section 4b (which is accessible through the notch) to prevent the lower tubular section from simply sliding out of the upper tubular section 4a when the clamp 16 is in the open position. That is, when the clamp 16 is in the open position, very little pressure would be applied to the joint end 6 of the upper tubular section 4a so that the upper tubular section would not grip the lower tubular section 4b and, without the foam insert 70, could likely slide from the upper tubular section 4a.

The clamp structure described provides a low profile, compact, easy to clamp and unclamp apparatus for use with telescoping ski pole halves to thereby provide an adjustable length ski pole.

FIGS. 6–10 show various views of another embodiment of an adjustable length ski pole and clamp, also made in accordance with the present invention. Again, a ski pole 104 is shown in fragmented form to include an upper tubular section 104a and a lower tubular section 104b (FIGS. 8 and 9) telescopically joined together. A notch 112 is formed in the upper tubular section 104a similar to that described for the ski pole of FIGS. 3 and 4.

A clamp 116 includes a tubular barrel member 120 having an annular sidewall 124 formed to define a cylindrical bore 128 into which is disposed the ski pole 104. A gap or slot 132 is formed on one side of the sidewall 124 to extend longitudinally the length of the sidewall. The slot 132 defines opposing and facing sidewall edges 132a and 132b. Formed in the sidewall 124 generally opposite the location of the slot 132 is a window 134, for purposes to be described momentarily. Projecting upwardly from the exterior of the sidewall 124 and from respective sidewall edges 132a and 132b are a pair of earpieces 136a and 136b. The earpieces 136a and 136b are formed with coaxial bores 138a and 138b (FIG. 10) respectively for receiving a pin 140 (shown as threaded in the drawings). The earpiece 136a includes an exterior camming surface 144 located oppositely from the slot 132.

The clamp 116 also includes a curved lever arm 148. The lever arm includes a pivot end 150, a curved middle portion 152 and a terminal end 154. The pivot end 150 of the lever arm 148 is formed into a fork, with a pin 158 extending across the fork and through an opening in one end of the pin 140 to pivotally join the lever arm 148 to the pin 140. The other end of the pin 140 is anchored in the bore 138b of the earpiece 136b by a nut, enlarged head, etc. The pivot end 150 also includes a camming knuckle 162 which coacts with the camming surface 144 when the lever arm 148 is moved from an open position (shown in FIGS. 6 and 7) to a closed position (shown in FIGS. 8–10), to urge the sidewall edge 132a towards the sidewall edge 132b to thereby contract or reduce the diameter of the central bore 128, all in the same manner as described for the clamp of FIGS. 1–5.

The terminal end 154 of the lever arm 148 includes a notch 166 to enable grasping the lever arm when the lever arm is in the closed position, to move the lever arm to the open position, as will be described momentarily. The middle portion 152 of the lever arm 148 is formed to have substantially the same radius of curvature as the sidewall 124, and the lever arm is so dimensioned to nest and fit snugly in the window 134 formed in the sidewall 124 of the barrel member 120, when the lever arm is in the closed position. When in the closed position, the provision of the notch 166 allows for the insertion of a finger thereinto to raise the lever arm and move it from the closed position to the open position. The nesting of the lever arm 48 and the window 134 provides the clamp 116 with a low, aesthetically pleasing profile when mounted on the ski pole 104.

Again, a porous insert 170 made, for example, of neoprene rubber, may be disposed in the gap or slot 132 to both prevent the entry of water and/or snow into the slot and to serve to contact the lower tubular section of 4b via the slot 112 formed in the upper tubular section 4a and prevent sliding out of the lower tubular section 4b.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. An adjustable length ski pole comprising an upper tubular section having an upper handle end and a lower joint end, a lower tubular section having a lower basket end and an upper joint end, said joint ends of the upper and lower sections being telescopically joined to slide relative to one another, with one of the upper and lower joint ends circumscribing the other one of the upper and lower joint ends and being squeezable to frictionally grip said other joint end, and a low profile clamp disposable about said one joint end and including a barrel-shaped member having an annular sidewall, open at both ends, defining a central longitudinally extending cylindrical bore for receiving one joint end, said sidewall having an upper end, a lower end, and a slot extending between the upper end and lower end to define facing side edges which, when urged toward one another, reduces the central bore diameter to tighten around said one joint end and, when urged apart, enlarges the central bore diameter, one of said side edges including a camming surface so that when a force is applied thereto, said one side edge is urged toward the other side edge, said annular sidewall having an opening formed therein opposite said slot, and lever arm means pivotally attached to the facing side edges of the barrel member to pivot between a closed position, in which a curved portion of the lever arm means nests within said opening and contacts and rests against said one joint end to cause the barrel member to squeeze said one joint end so that said one joint end grips said other joint end, and an open position, in which the lever arm means is pivoted away from said one joint end to release the grip by said one joint end of the other joint end, said annular sidewall along opposite ends of said opening having an outer surface forming a substantially smooth surface with an outer surface of said lever arm means when in the closed position, wherein said lever arm means includes a camming knuckle which, when the lever arm means is pivoted to the closed position, contacts and applies a force to the camming surface of said one side edge.

2. An adjustable length ski pole as in claim 1 wherein the opening includes a proximal side, opposite lateral sides, and a distal side, and wherein said curved arm includes a proximal end and distal end, said proximal end being pivotally attached to the facing side edges of the barrel member adjacent the proximal side of the window, said curved arm including a notch formed in the distal end to lie adjacent the distal side of the window and allow the insertion into the notch of a finger to enable lifting the curved arm to move it from the closed position to the open position.

3. An adjustable length ski pole as in claim 1 wherein said one joint end includes an elongate slot disposed below the slot in the sidewall of the barrel member, said ski pole further including a flexible insert disposed in the slot of the sidewall to extend through the slot of said one joint end to contact said other joint end and prevent the sliding thereof out of said one joint end.

4. A clamp for clamping about a cylindrical shaft, comprising a resilient tubular member having a sidewall defining a longitudinal cylindrical bore for receiving the cylindrical shaft, said sidewall formed with a longitudinally extending gap to allow the tubular member to be selectively biased to reduce the gap width and thus the diameter of the bore or enlarge the gap width and thus the diameter of the bore, said gap defining first and second opposing sidewall edges having coaxial first and second openings respectively, said sidewall having a opening formed therein opposite said gap pin means anchored at one end in the first opening to extend with the other end through the second opening, and a curved lever arm pivotally attached at one end to the other end of the pin means, to move between a clamped position, in which the lever arm is formed to nest within said opening in contact with the cylindrical shaft to bias the first and second sidewall edges towards one another, and an unclamped position, in which the lever arm is pivoted away from the cylindrical shaft to allow the gap to widen, said sidewall along opposite ends of said opening having an outer surface forming a substantially smooth surface with an outer surface of said lever arm when in the clamped position, said second sidewall edge including a camming surface, and said lever arm including a camming knuckle formed at said one end of the lever arm to contact the camming surface and force the second sidewall edge toward the first sidewall edge when the lever arm is pivoted to the clamped position.

5. A clamp as in claim 4 further including a resilient insert disposed in the gap to prevent the entry thereinto of snow or water.

* * * * *

UNITED STATES PATENT AND TRADEMARK OFFICE
CERTIFICATE OF CORRECTION

PATENT NO. : 5,478,117
DATED : December 26, 1995
INVENTOR(S) : Jason Quintana, Steve C. McDonald and Jordan Margid It is certified that error appears in the above-indentified patent and that said Letters Patent is hereby corrected as shown below:

On the title page: Item [54] and Column 1, line 1, change

"Pol/Clamp" to --Pole/Clamp --.

Signed and Sealed this

Thirtieth Day of April, 1996

Attest:

BRUCE LEHMAN

*Attesting Officer*  *Commissioner of Patents and Trademarks*